US011970382B2

United States Patent
Bandini et al.

(10) Patent No.: US 11,970,382 B2
(45) Date of Patent: Apr. 30, 2024

(54) FILLING DEVICE CONFIGURED TO FILL ARTICLES WITH A POURABLE PRODUCT

(71) Applicant: SIDEL PARTICIPATIONS, Octeville-sur-Mer (FR)

(72) Inventors: Filippo Bandini, Parma (IT); Michele Ollari, Parma (IT)

(73) Assignee: SIDEL PARTICIPATIONS

( * ) Notice: Subject to any disclaimer, the term of this patent is extended or adjusted under 35 U.S.C. 154(b) by 206 days.

(21) Appl. No.: 17/787,588

(22) PCT Filed: Dec. 19, 2019

(86) PCT No.: PCT/EP2019/086187
§ 371 (c)(1),
(2) Date: Jun. 20, 2022

(87) PCT Pub. No.: WO2021/121593
PCT Pub. Date: Jun. 24, 2021

(65) Prior Publication Data
US 2022/0411248 A1    Dec. 29, 2022

(51) Int. Cl.
*B67C 3/28*    (2006.01)
*F16K 31/08*   (2006.01)

(52) U.S. Cl.
CPC ............. *B67C 3/28* (2013.01); *F16K 31/086* (2013.01)

(58) Field of Classification Search
CPC ................................ F16K 31/086; B67C 3/28
See application file for complete search history.

(56) References Cited

U.S. PATENT DOCUMENTS

| 5,213,307 A * | 5/1993 | Perrillat-Amede ... F16K 31/088 251/65 |
| 7,717,396 B2 * | 5/2010 | Graffin ................. F16K 31/086 251/65 |
| 10,302,214 B2 * | 5/2019 | Bandini .................... B67C 3/28 |
| 2017/0050753 A1 * | 2/2017 | Glock ..................... A61J 1/201 |

FOREIGN PATENT DOCUMENTS

| EP | 0436214 A1 | 7/1991 |
| EP | 2768763 A1 | 8/2014 |
| EP | 2881636 A1 | 6/2015 |
| EP | 3165500 A1 | 5/2017 |
| WO | 2014/153520 A2 | 9/2014 |

OTHER PUBLICATIONS

International search report dated Sep. 14, 2020.

* cited by examiner

*Primary Examiner* — Timothy L Maust

(57) ABSTRACT

A filling device to fill articles with a pourable product comprising: a tubular body internally defining a flow channel; a valve member engaging the tubular body and axially movable within the flow channel to allow or prevent flow of the pourable product; and magnetic actuator configured to drive axial movement of the valve member within the flow channel. The magnetic actuator has a driven magnetic assembly carried by the valve member and a driving magnetic assembly arranged outside the flow channel and configured to be magnetically coupled with the driven magnetic assembly to control the movement of the valve member within the flow channel.

20 Claims, 4 Drawing Sheets

FILLING DEVICE CONFIGURED TO FILL ARTICLES WITH A POURABLE PRODUCT

TECHNICAL FIELD

The present invention relates to a filling device configured to fill articles with a pourable product, preferably a pourable food product such as water, carbonated beverages, milk, juice or the like.

BACKGROUND ART

Filling machines typically used for filling articles, in particular containers such as plastic or glass bottles, cans, jars or the like, with a pourable product are known. Such filling machines essentially comprise a conveyor device, usually a rotatable conveyor device such as a carousel rotatable about a vertical axis, a reservoir containing the pourable product and a plurality of filling devices.

In detail, such filling devices are peripherally carried by the carousel, are fluidly connected to the reservoir by means of respective ducts and are conveyed by the carousel along an arc-shaped transfer path.

Moreover, the filling machines usually comprise an inlet conveyor for feeding a succession of empty containers to the carousel and an outlet conveyor receiving the filled containers from the carousel and configured to feed such filled containers to further treatment units, for example a capping unit.

A typical filling device essentially defines a filling valve and comprises:
- a longitudinal tubular body mounted on a peripheral portion of the carousel and internally defining a flow channel for feeding the pourable product towards a respective empty container;
- at least one valve body, normally a shutter, which engages the tubular body in a sliding manner and is movable along the flow channel so as to allow or prevent the flow of the pourable product towards the respective container; and
- actuator means configured to control the movement of the shutter within the flow channel.

In some known embodiments, the flow channel has a straight configuration presenting a longitudinal axis parallel to the carousel axis.

Typically, the flow channel terminates, at a lower end portion thereof, with an outlet passage section, i.e. an outlet opening, configured to allow, in use, the outflow of the pourable product from the flow channel towards the respective container to be filled.

Generally, the outlet opening is arranged at a bottom end of the tubular body coaxially to the tubular body axis.

Alternatively, the outlet opening is obtained in a lateral wall of the tubular body, hence laterally with respect to the tubular body axis.

In order to control the shutter while ensuring complete isolation between the flow channel and external components, actuator means of the magnetic type are known, which comprise a driving magnetic assembly, usually arranged outside the tubular body, and a driven magnetic assembly carried by the shutter. Such magnetic actuator means are particularly advantageous to ensure the proper aseptic conditions of the filling valve.

In some embodiments, the driving magnetic assembly and the driven magnetic assembly are defined by permanent magnets, which are configured to be magnetically coupled to one another so that a movement, in particular an axial movement along the above longitudinal axis, of the driving magnetic assembly determines a corresponding axial movement of the driven magnetic assembly, and therefore of the shutter, within the flow channel.

Although being functionally valid, the known filling devices are open for further improvements.

In particular, a need is felt to improve the magnetic coupling between the driving magnetic assembly and the driven magnetic assembly of the magnetic actuator means, while, at the same time, reducing the magnetic interferences with the magnetic actuator means of the other filling devices carried by the carousel of the same filling machine.

Disclosure of Invention

It is therefore an object of the present invention to provide a filling device which is designed to meet the above-mentioned need in a straightforward and low-cost manner.

This object is achieved by a filling device as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
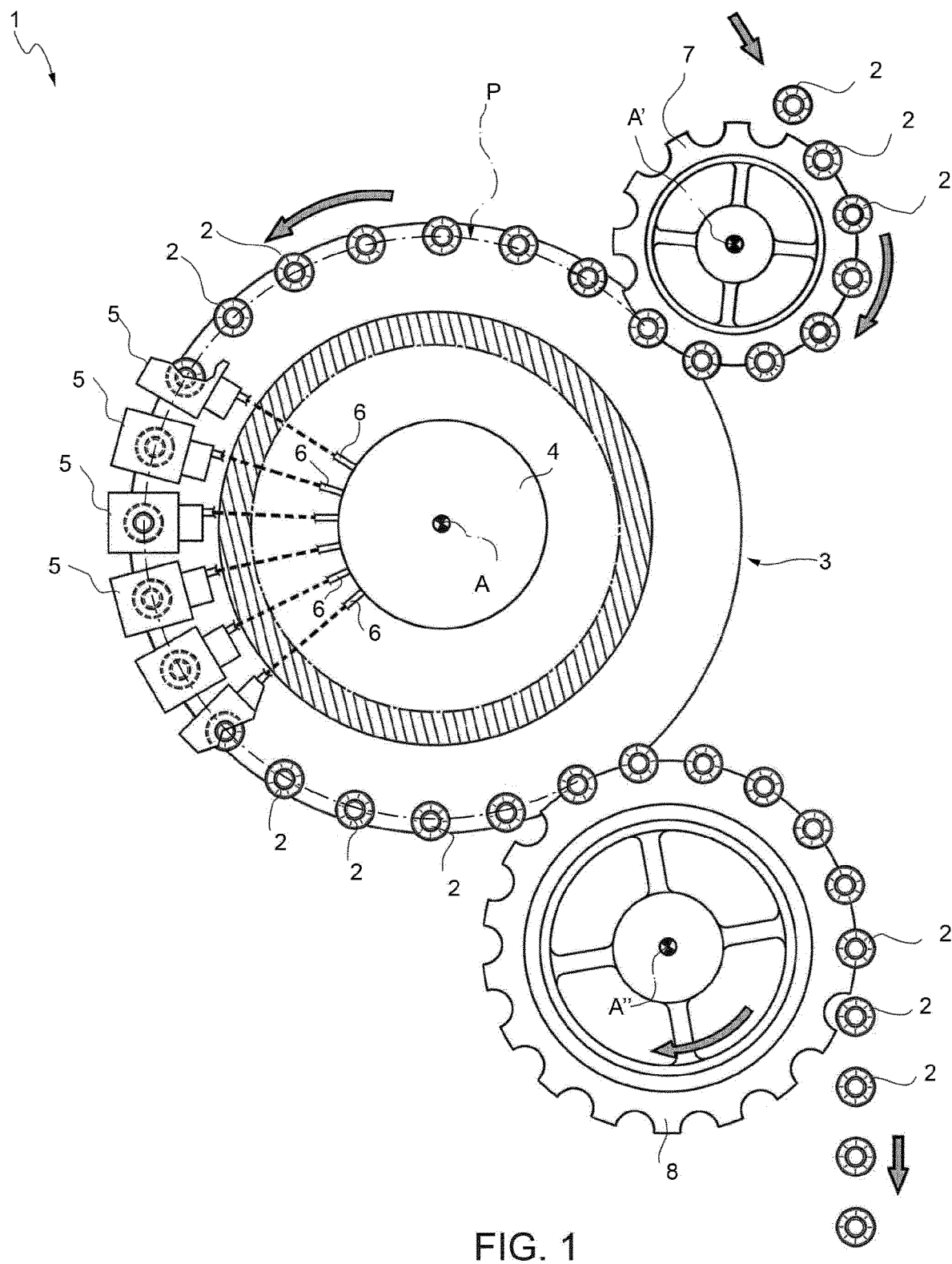
FIG. 1 is a top schematic view, with parts removed for clarity, of a filling machine comprising a plurality of filling devices according to the teachings of the present invention.

With reference to FIG. 1, number 1 indicates as a whole a filling machine for filling a plurality of articles, in particular containers 2 such as plastic or glass bottles, cans, jars or the like, with a pourable product, preferably a pourable food product.

Filling machine 1 essentially comprises:
- a conveying device, in particular a carousel 3 rotatable around a central axis A, preferably having a vertical orientation, and configured to advance containers 2 along an arc-shaped advancement path P;
- a reservoir 4 for containing the pourable product to be fed to the containers 2; and
- a plurality of filling devices 5 configured to fill respective containers 2 during their advancement along path P.

In detail, each filling device 5 defines a filling valve configured to feed a predetermined volume of pourable product into one container 2 at a time, while the container 2 is advanced along path P due to the rotary motion imparted thereto by carousel 3.

More specifically, each filling device 5 is peripherally carried by carousel 3 and is fluidly connected to reservoir 4 by means of a respective duct 6 of filling machine 1.

As visible in FIG. 1, filling machine 1 further comprises an inlet conveyor, preferably a star wheel 7, adapted to feed a succession of empty containers 2 to carousel 3, and an outlet conveyor, preferably a star wheel 8, adapted to receive filled containers 2 from carousel 3.

In particular, star wheel 7 and star wheel 8 are rotatable around respective rotation axes A' and A'', substantially parallel to axis A.

It is stated that the word "substantially" is used in the present description to take into account the normal tolerance ranges which may be present among the spatial relations between the various components of filling machine 1.

In the following, for the sake of brevity, since filling devices 5 are identical to one another, only one single filling device 5 according to a non-limiting preferred embodiment of the present invention and configured to fill a respective container 2 will be described.

However, all the features disclosed hereinafter for such filling device 5 and container 2 are applicable to each filling device 5 of filling machine 1 and to each container 2 to be filled by filling machine 1.

Figure 2:
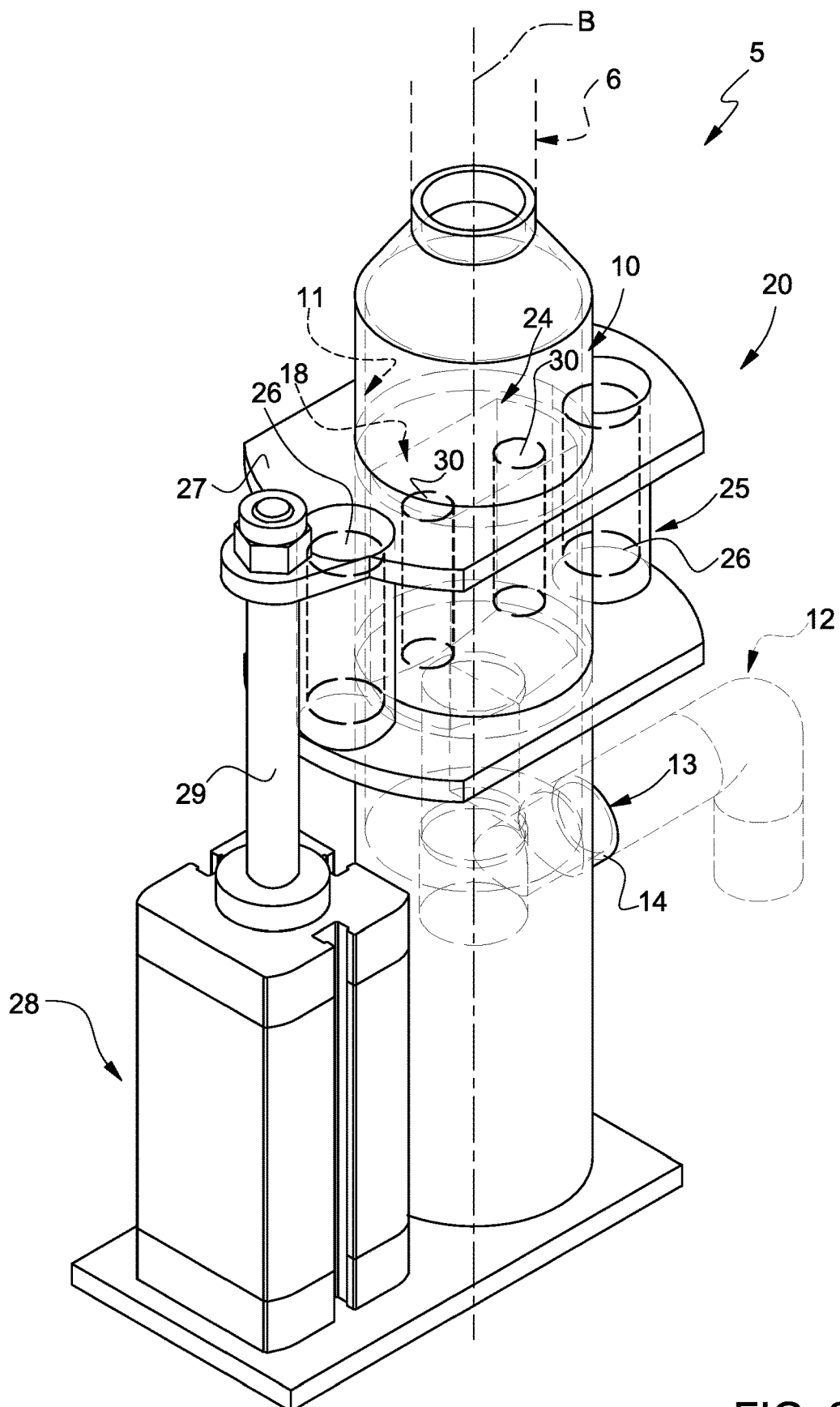
FIG. 2 is a larger-scale, schematic perspective view, with parts removed for clarity, of one filling device of FIG. 1.

With particular reference to FIG. 2, filling device 5 comprises a tubular body 10 mounted in a known manner on a peripheral portion of carousel 3, having a longitudinal axis B and internally defining a flow channel 11 for feeding the pourable product towards the empty container 2.

In particular, tubular body 10 receives, in use, the pourable product from the respective duct 6 and delivers the predetermined volume of pourable product into a discharge duct 12 arranged downstream of flow channel 11 and adapted to convey the pourable product towards and into container 2.

In particular, flow channel 11 is delimited by a respective inner wall, in particular an inner tubular wall of tubular body 10, which has a variable, substantially circular cross-section and terminates, at a lower end portion of tubular body 10, with an outlet opening 13 fluidly connecting flow channel 11 with duct 12, and therefore flow channel 11 with the container 2 to be filled.

According to this non-limiting preferred embodiment shown, outlet opening 13 is obtained in a position lateral with respect to axis B, and thus not coaxial to axis B.

More specifically, outlet opening 13 is defined by a spout 14 radially projecting from the outer wall defining tubular body 10, relative to axis B, and connected to duct 12.

Figure 3A:
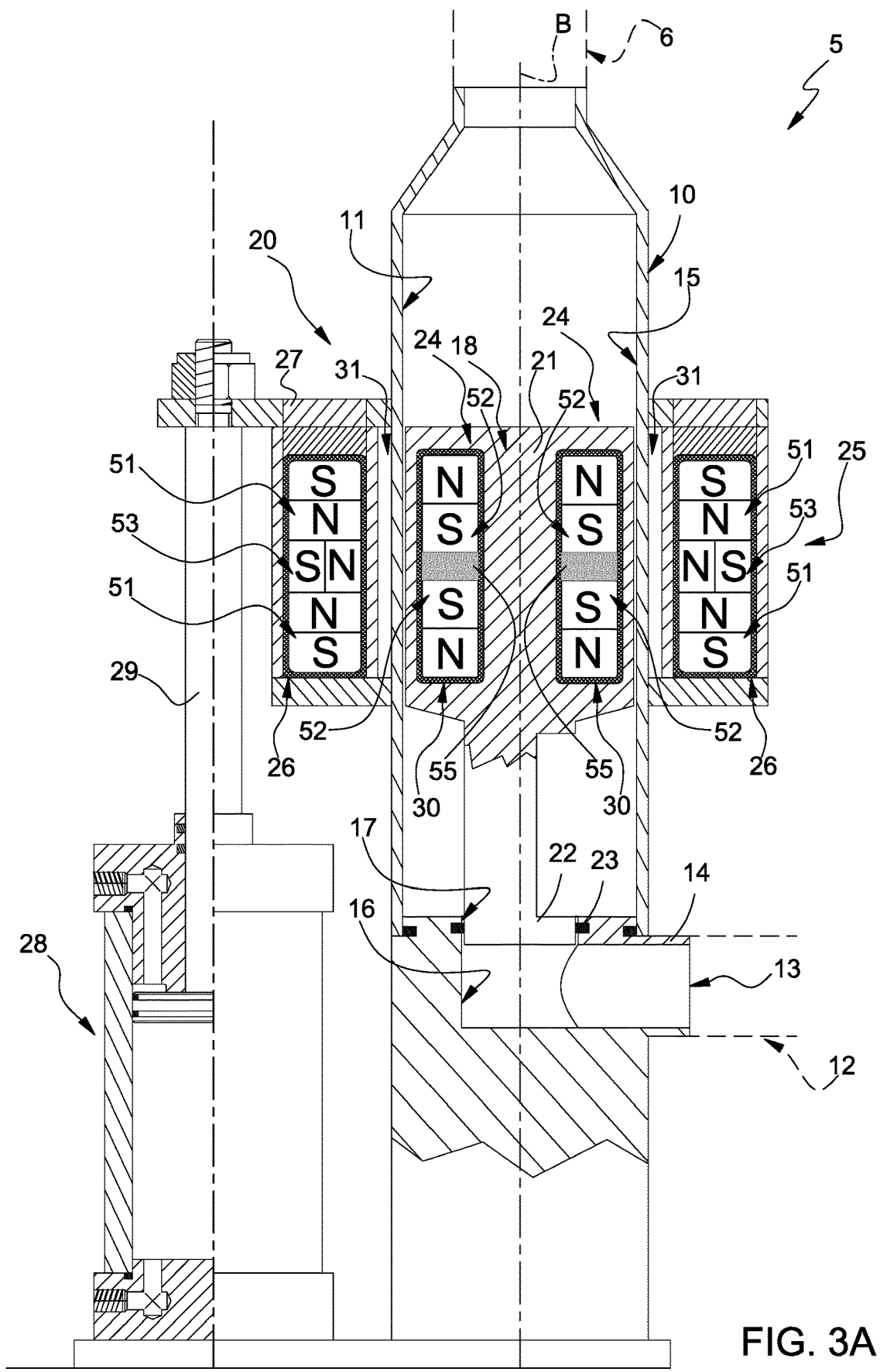
FIGS. 3a and 3b are larger-scale, partially sectioned views of the filling device of FIG. 2, during two different operating conditions.
Figure 3B:
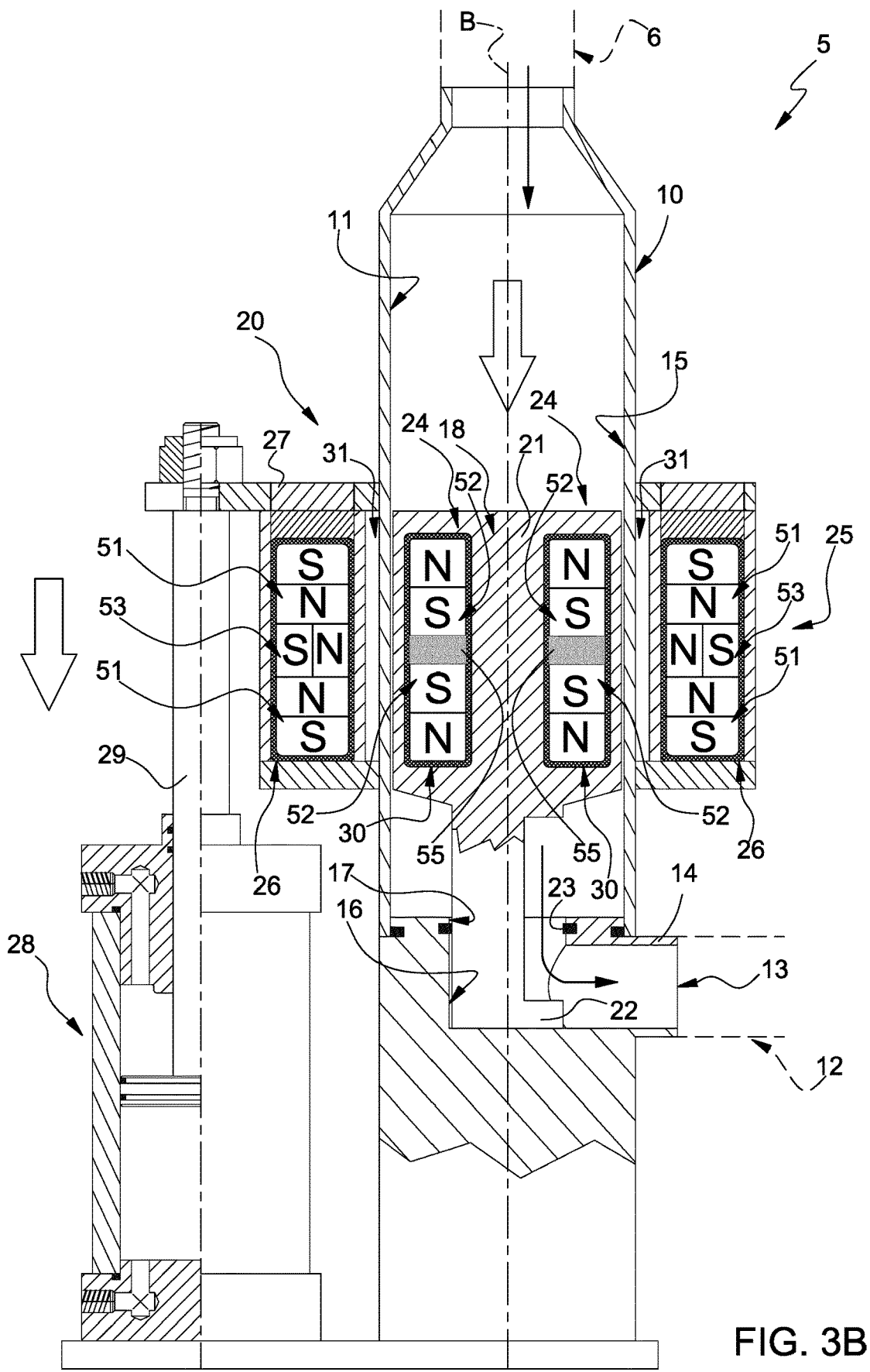

As visible in FIGS. 3a and 3b, tubular body 10 comprises (following the flowing direction of pourable product from duct 6 towards duct 12) a first portion 15 substantially cylindrical and having a substantially constant circular cross-section; a second portion 16 substantially cylindrical, and having a circular cross-section with a diameter smaller than the diameter of first portion 15; and a third portion 17, arranged downstream of first portion 15 and upstream of second portion 16 and defining a narrow-section portion of flow channel 11.

First portion 15, second portion 16 and third portion 17 are coaxial to axis B.

Filling device 5 further comprises a valve member, in particular a shutter 18, which engages tubular body 10 and which is axially movable within flow channel 11 to allow or prevent the flow of the pourable product towards container 2.

In detail, shutter 18 comprises a main body 21 engaging first portion 15, coaxially to axis B, and a plunger 22 axially extending from main body 21 and apt to selectively engage third portion 17 and second portion 16, according to a manner further described in the following.

In the example shown, plunger 22 integrally extends from main body 21 towards outlet opening 13.

According to this preferred embodiment shown, shutter 18 has an asymmetrical configuration relative to axis B. Such configuration may be necessary in many cases, for example when dosing filling devices 5 configured to handle a pourable product with pieces in suspension, for example yogurt or juice with fruit pieces in suspension, are envisaged, so as to ensure the proper dosage and flowing of such pourable product.

Filling device 5 also comprises magnetic actuator means 20 configured to drive the axial movement of shutter 18 within flow channel 11.

As shown in FIGS. 3a and 3b, actuator means 20 are configured to drive shutter 18 so as to control the latter in:
an opening position, in which plunger 22 engages second portion 16 and delimits, together with third portion 17, a passage for the pourable product to flow from first portion 15 into second portion 16 through third portion 17, and therefore towards duct 12 and container 2 (FIG. 3b); and
a closing position, in which plunger 22 sealingly cooperates with the inner wall of third portion 17 so as to prevent any fluidic connection between first portion 15 and second portion 16, thereby interrupting the flow of the pourable product towards duct 12 and container 2 (FIG. 3a).

To this end, plunger 22 carries a sealing member, for example a known O-ring 23, configured to sealingly cooperate in contact with the inner wall of third portion 17, when shutter 22 is driven in the closing position.

Actuator means 20 comprise a driven magnetic assembly 24 carried by shutter 18, in particular by main body 22, and a driving magnetic assembly 25 arranged outside flow channel 11, in particular outside tubular body 10, and configured to be magnetically coupled with driven assembly 24 to control the movement of shutter 18 within flow channel 11.

In detail, driving assembly 25 comprises a pair of first magnetic elements 26 arranged at diametrically opposite lateral sides of tubular body 10, each preferably at the same radial distance from axis B.

In greater detail, actuator means 20 further comprise an annular carrier 27 positioned to surround a portion of the outer wall of tubular body 10, coaxially to axis B, and carrying, in particular housing, first magnetic elements 26 so that these latter are positioned adjacent to the outer wall of tubular body 10, at the respective above-mentioned diametrically opposite lateral sides of tubular body 10.

Carrier 27 is configured to be axially moved thereby controlling the axial position of the first magnetic elements 26.

To this end, actuator means 20 further comprise a pneumatic actuator, preferably a known pneumatic piston 28, arranged laterally with respect to tubular body 10 and coupled to carrier 27 by means of a rod 29.

In use, by actuating piston 28 in a known manner, it is possible to control the axial movement of carrier 27 and, therefore, of first magnetic elements 26 along the axial direction, relative to axis B.

According to an alternative embodiment not shown, actuator means 20 could comprise any suitable actuator to control the movement of carrier 27, such as an hydraulic piston, an electric stepper motor, a linear motor, or the like.

Driven assembly 24 comprises at least one second magnetic element 30 arranged within shutter 18, in particular within main body 21.

Preferably, but not necessarily, driven assembly 24 comprises a pair of second magnetic elements 30 arranged within shutter 18, in particular within main body 21, at respective peripheral position of main body 21 relative to axis B.

In particular, second magnetic elements 30 are embedded within main body 21 at a peripheral annular portion thereof.

Furthermore, each first magnetic element 26 defines a magnetic pair 31 with the closest one of the two second magnetic elements 30.

In practice, with reference to FIGS. 3a and 3b, actuator means 20 comprise two magnetic pairs 31, each magnetic pair 31 being defined by one first magnetic element 26 and the second magnetic element 30 closest to the former.

Conveniently, as shown in FIG. 2, the magnetic pairs 31 are arranged so as to define a single row of magnetic pairs 31 along a single radial direction relative to axis B.

It is stated that with the expression "row" it is intended herein a plurality of at least two magnetic pairs 31 aligned along the above-mentioned single radial direction relative to axis B.

Preferably, magnetic actuator means 20 comprise exactly two magnetic pairs 31 arranged at radially opposite positions relative to axis B.

As visible in FIGS. 3a and 3b:
- each first magnetic element 26 comprises two first magnetic dipoles 51 arranged in axial succession relative to one another, at the same radial distance from axis B and in respective positions such that the relative magnetic poles of equal signs (i.e. having equal signs) axially face one another;
- each second magnetic element 30 comprises two second magnetic dipoles 52 arranged in axial succession relative to one another, at the same radial distance from axis B and in respective positions such that the relative magnetic poles of equal signs axially face one another; and
- each first magnetic element 26 further comprises a third magnetic dipole 53 axially interposed between the two first magnetic dipoles 51 and including magnetic poles arranged in radial succession relative to axis B, the radially innermost magnetic pole of the third magnetic dipole 53 having sign equal to the signs of the magnetic poles of the first magnetic dipoles 51 facing one another axially.

Furthermore, for each magnetic pair 31, the first magnetic element 26 radially faces the second magnetic element 30, so that the magnetic poles of the first and third magnetic dipoles 51, 53 and the magnetic poles of the second magnetic dipoles 52 having opposite signs face one another radially. In other words, for each magnetic pair 31, the first magnetic element 26 faces the second magnetic element 30 so that the magnetic poles of the first and third magnetic dipoles 51, 53 radially face the magnetic poles of the second magnetic dipoles 52 which have respective signs opposite to the signs of the facing magnetic poles of the first and third magnetic dipoles 51, 53.

In practice, for each magnetic pair 31, the magnetic poles of opposite signs radially face one another.

In light of the above, the radially innermost magnetic pole of third magnetic dipole 53 has sign opposite to the sign of the magnetic poles of second magnetic dipoles 52 facing one another axially.

Also, the magnetic poles axially facing one another of first magnetic dipoles 51 have opposite sign with respect to the magnetic poles axially facing one another of second magnetic dipoles 52.

In this specific example, the magnetic poles axially facing one another of first magnetic dipoles 51 are north poles, whereas the magnetic poles axially facing one another of second magnetic dipoles 52 are south poles.

Accordingly, the radially innermost magnetic pole of each third magnetic dipole 53 is a north pole.

Alternatively, the magnetic poles axially facing one another of first magnetic dipoles 51 could be south poles, whereas the magnetic poles axially facing one another of second magnetic dipoles 52 could be north poles. In this last case, the radially innermost magnetic pole of each third magnetic dipole 53 would be a south pole.

Regardless of the number of second magnetic elements embedded in shutter 18 (one or two or more), the peculiar disposition of magnetic poles of magnetic actuator means 20 is particularly advantageous, since it provides a sort of canalization of the magnetic flux, which causes a strong magnetic coupling between driving magnetic assembly 25 and driven magnetic assembly 24.

In fact, the Applicant has observed that the above peculiar disposition causes a deflection of the most part of the magnetic flux in the radially internal direction, relative to axis B, thereby improving the magnetic coupling force between driving magnetic assembly 25 and driven magnetic assembly 24, while, at the same time, reducing the magnetic interaction between nearby filling devices 5 carried by carousel 3.

Additionally, in the case in which driven magnetic assembly comprises a pair of second magnetic elements 30 as described above, each second magnetic element 30 is magnetically coupled substantially only with the most adjacent first magnetic element 26. In other words, each first magnetic element 26 is relatively more strongly magnetically coupled with the second magnetic element 30 of the same magnetic pair 31 than with the second magnetic element 30 of the other magnetic pair 31.

Thanks to this configuration, the angular displacement of main body 21, and therefore, of shutter 18 relative to axis B is substantially prevented.

In fact, a stable system is obtained, in which if any angular displacement of shutter 18 relative to axis B occurs, each second magnetic element 30 is attracted by the relative first magnetic element 26 of the same magnetic pair 31, thereby controlling an angular displacement of shutter 18 back in its original pre-determined angular position, the latter being originally determined by the relative arrangement of driving assembly 25 and driven assembly 24.

In other words, the above-described configuration of magnetic actuator means 20 allows to obtain an effect of angular blockage of shutter 18 about axis B.

It is hereby stated that the verb "to face" indicates in the present description that the magnetic poles face one another magnetically, i.e. they are oriented towards one another so that a magnetic interaction is established between them, with or without any material in between. In the present case, for each magnetic pair 31, the magnetic poles of first elements face the magnetic poles of second elements 30 according to such meaning, despite the wall of tubular body 10 and an annular peripheral portion of main body 21 is interposed between them.

Preferably, each third magnetic dipole 53 is adjacent to the two respective first magnetic dipoles 51 of the same first magnetic element 26.

In particular, each first magnetic element 26 comprises exactly two first magnetic dipoles 51 and one third magnetic dipole 53 axially interposed between the two first magnetic dipoles 51.

Preferably, each second magnetic element 30 comprises a ferromagnetic element, in particular a ferromagnetic washer 55 axially interposed between second magnetic dipoles 52.

Each washer 55 provides for an even stronger canalization of the magnetic flux from first magnetic elements 26 to the corresponding second magnetic elements 30.

Preferably, the radially innermost magnetic pole of third magnetic dipole 53 is arranged so as to radially face washer 55.

The operation of filling machine 1 is described hereinafter with reference to a single filling device 5 and starting from a condition in which shutter 18 is at its closing position.

In this condition, actuator means 20 are controlled so as to drive shutter 18 at its opening position, by means of the magnetic interaction between driving assembly 25 and driven assembly 24, i.e. by means of the two magnetic pairs 31.

The peculiar disposition of magnetic dipoles 51, 52, 53 ensures a deflection of the most part of the magnetic flux produced therefrom in the radially internal direction, relative to axis B.

Furthermore, the particular arrangement of first magnetic elements 26 and second magnetic elements 30, prevents any permanent angular displacement of main body 21 within first portion 15, thereby providing a control of the angular position of shutter 18 within flow channel 11.

When the predetermined amount of pourable product has been fed to duct 12, the shutter 18 is controlled back at its closing position.

The advantages of filling device 5 according to the present invention will be clear from the foregoing description.

In particular, regardless of the number of second magnetic elements 30 embedded in shutter 18 (one or two or more), the peculiar disposition of magnetic poles of magnetic actuator means 20 provides for a strong magnetic coupling between driving magnetic assembly 25 and driven magnetic assembly 24.

In fact, the Applicant has observed that the above peculiar disposition causes a deflection of the most part of the magnetic flux in the radially internal direction, relative to axis B, thereby improving the magnetic coupling force between driving magnetic assembly 25 and driven magnetic assembly 24 and reducing the magnetic interaction between near filling devices 5 carried by carousel 3.

Thus, the above described peculiar disposition it is also advantageous since it allows to reduce the total amount of magnetic material needed for ensuring the desired magnetic coupling (and therefore to reduce the overall cost of filling device 5).

Additionally, since the magnetic coupling force between driving magnetic assembly 25 and driven magnetic assembly 24 is increased, the radial clearance for product passage within flow channel 11 can be increased.

Furthermore, in the case in which driven magnetic assembly 24 comprises a pair of second magnetic elements 30, and therefore in the case in which magnetic actuator means 20 comprise two magnetic pairs 31, the angular displacement of main body 21, and therefore of shutter 18, relative to axis B is substantially prevented.

In fact, a stable system is provided, in which if any angular displacement of shutter 18 occurs, each second magnetic element 30 is attracted by the relative first magnetic element 26 of the same magnetic pair 31, thereby controlling an angular displacement of shutter 18 back in its original pre-determined angular position.

This is particularly advantageous in the cases in which, as in the embodiment described herein, the shutter has an asymmetric configuration.

Furthermore, actuator means 20 according to the present invention provide a simple and economic angular stop for shutter 18 which is not subject to any wear, since there are no sliding or abutting parts.

Moreover, actuator means 20 can easily limit, in particular prevent, the angular displacement of shutter without any specific component arranged inside the flow channel, thereby preventing any hindering factor for the flow of the pourable product.

Clearly, changes may be made to filling device 5 as described herein without, however, departing from the scope of protection as defined in the accompanying claims.

The invention claimed is:

1. A filling device (5) configured to fill articles (2) with a pourable product and comprising:
    a tubular body (10) having a longitudinal axis (B) and internally defining a flow channel (11) for feeding the pourable product towards one empty article (2) at a time;
    a valve member (18) engaging the tubular body (10) and axially movable within the flow channel (11) to allow or prevent the flow of the pourable product towards said article (2); and
    magnetic actuator (20) configured to drive axial movement of the valve member (18) within the flow channel (11);
    said magnetic actuator (20) comprising a driven magnetic assembly (24) carried by the valve member (18) and a driving magnetic assembly (25) arranged outside the flow channel (11) and configured to be magnetically coupled with the driven magnetic assembly (24) to control the movement of the valve member (18) within the flow channel (11);
    said driving magnetic assembly (25) having a pair of first magnetic elements (26) arranged at diametrically opposite lateral sides of said tubular body (10) and said driven magnetic assembly (24) having at least one second magnetic element (30) arranged within said valve member (18);
    wherein each one of said first magnetic elements (26) comprises two first magnetic dipoles (51) arranged in axial succession relative to one another, at the same radial distance from said axis (B), and in respective positions such that the relative magnetic poles of equal signs axially face one another;
    wherein said second magnetic element (30) comprises two second magnetic dipoles (52) arranged in axial succession relative to one another, at the same radial distance from said axis (B), and in respective positions such that the relative magnetic poles of equal signs axially face one another;
    wherein each first magnetic element (26) further comprises a third magnetic dipole (53) axially interposed between said two first magnetic dipoles (51) and including magnetic poles arranged in radial succession relative to said axis (B), the radially innermost magnetic pole of said third magnetic dipole (53) having sign equal to the signs of the magnetic poles of said first magnetic dipoles (51) facing one another axially; and
    wherein the first magnetic elements (26) radially face the second magnetic element (30) so that the magnetic poles of the first and third magnetic dipoles (51, 53) and the magnetic poles of the second magnetic dipoles (52) having opposite signs face one another radially.

2. The filling device as claimed in claim 1, wherein said first magnetic elements (26) are arranged at the same radial distance from said axis (B).

3. The filling device as claimed in claim 1, wherein said second magnetic member (30) comprises a ferromagnetic member (55) axially interposed between said second magnetic dipoles (52).

4. The filling device as claimed in claim 3, wherein the radially innermost magnetic pole of each said third magnetic dipole (53) radially faces said ferromagnetic element (55).

5. The filling device as claimed in claim 1, wherein, for each first magnetic element (26), said third magnetic dipole (53) is adjacent to said first magnetic dipoles (51).

6. The filling device as claimed in claim 1, wherein each first magnetic element (26) comprises exactly two first magnetic dipoles (51) and one third magnetic dipole (53).

7. The filling device as claimed in claim 1, wherein said driven magnetic assembly (24) has a pair of said second magnetic elements (30) arranged within said valve member (18) at respective peripheral positions relative to said axis (B);
   wherein each one of the first magnetic elements (26) defines a magnetic pair (31) together with the closest one of the second magnetic elements (30); and
   wherein, for each magnetic pair (31), the first magnetic element (26) radially faces the second magnetic element (30) so that the magnetic poles of the first and third magnetic dipoles (51, 53) and the magnetic poles of the second magnetic dipoles (52) having opposite signs face one another radially.

8. The filling device as claimed in claim 7, wherein said second magnetic elements (30) are arranged at the same radial distance from said axis (B).

9. The filling device as claimed in claim 7, wherein said magnetic pairs (31) are arranged so as to define a single row of magnetic pairs (31) along a single radial direction relative to said axis (B).

10. The filling device as claimed in claim 9, wherein said magnetic actuator (20) comprise exactly two magnetic pairs (31) arranged along said single radial direction.

11. A machine (1) configured for filling articles (2) with a pourable product comprising:
   a conveying device (3) configured to advance a succession of said articles (2) along an advancement path (P); and
   a plurality of filling devices (5) as claimed in claim 1, carried by said conveying device (3) and configured to fill respective articles (2) during their advancement along path (P).

12. The filling device as claimed in claim 2, wherein said second magnetic member (30) comprises a ferromagnetic member (55) axially interposed between said second magnetic dipoles (52).

13. The filling device as claimed in claim 2, wherein, for each first magnetic element (26), said third magnetic dipole (53) is adjacent to said first magnetic dipoles (51).

14. The filling device as claimed in claim 3, wherein, for each first magnetic element (26), said third magnetic dipole (53) is adjacent to said first magnetic dipoles (51).

15. The filling device as claimed in claim 2, wherein each first magnetic element (26) comprises exactly two first magnetic dipoles (51) and one third magnetic dipole (53).

16. The filling device as claimed in claim 3, wherein each first magnetic element (26) comprises exactly two first magnetic dipoles (51) and one third magnetic dipole (53).

17. The filling device as claimed in claim 2, wherein said driven magnetic assembly (24) has a pair of said second magnetic elements (30) arranged within said valve member (18) at respective peripheral positions relative to said axis (B);
   wherein each one of the first magnetic elements (26) defines a magnetic pair (31) together with the closest one of the second magnetic elements (30); and
   wherein, for each magnetic pair (31), the first magnetic element (26) radially faces the second magnetic element (30) so that the magnetic poles of the first and third magnetic dipoles (51, 53) and the magnetic poles of the second magnetic dipoles (52) having opposite signs face one another radially.

18. The filling device as claimed in claim 3, wherein said driven magnetic assembly (24) has a pair of said second magnetic elements (30) arranged within said valve member (18) at respective peripheral positions relative to said axis (B);
   wherein each one of the first magnetic elements (26) defines a magnetic pair (31) together with the closest one of the second magnetic elements (30); and
   wherein, for each magnetic pair (31), the first magnetic element (26) radially faces the second magnetic element (30) so that the magnetic poles of the first and third magnetic dipoles (51, 53) and the magnetic poles of the second magnetic dipoles (52) having opposite signs face one another radially.

19. The filling device as claimed in claim 8, wherein said magnetic pairs (31) are arranged so as to define a single row of magnetic pairs (31) along a single radial direction relative to said axis (B).

20. A machine (1) configured for filling articles (2) with a pourable product comprising:
   a conveying device (3) configured to advance a succession of said articles (2) along an advancement path (P); and
   a plurality of filling devices (5) as claimed in claim 2, carried by said conveying device (3) and configured to fill respective articles (2) during their advancement along path (P).

* * * * *